United States Patent
Ying et al.

(10) Patent No.: US 9,491,296 B2
(45) Date of Patent: *Nov. 8, 2016

(54) SYSTEM AND METHOD FOR MANAGING MESSAGES IN A PACKETIZED VOICE ENVIRONMENT

(71) Applicant: AT&T Intellectual Property I, L.P., Atlanta, GA (US)

(72) Inventors: Goangshiuan Shawn Ying, Oakland, CA (US); Eugene L. Edmon, Danville, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 112 days.

This patent is subject to a terminal disclaimer.

(21) Appl. No.: 14/453,838

(22) Filed: Aug. 7, 2014

(65) Prior Publication Data
US 2014/0348031 A1 Nov. 27, 2014

Related U.S. Application Data

(60) Continuation of application No. 13/896,473, filed on May 17, 2013, now Pat. No. 8,848,883, which is a continuation of application No. 12/637,504, filed on Dec. 14, 2009, now Pat. No. 8,467,508, which is a division of application No. 10/887,210, filed on Jul. 8, 2004, now Pat. No. 7,684,549.

(51) Int. Cl.
| | |
|---|---|
| *H04M 1/64* | (2006.01) |
| *H04M 3/533* | (2006.01) |
| *H04M 1/253* | (2006.01) |
| *H04L 29/06* | (2006.01) |

(52) U.S. Cl.
CPC ...... *H04M 3/53308* (2013.01); *H04L 65/1006* (2013.01); *H04L 65/1083* (2013.01); *H04M 1/2535* (2013.01); *H04M 1/642* (2013.01)

(58) Field of Classification Search
CPC ............ H04M 3/533; H04M 3/5307; H04M 3/53333; H04M 3/42221; H04M 2201/60
See application file for complete search history.

(56) References Cited

U.S. PATENT DOCUMENTS

| | | | |
|---|---|---|---|
| 4,935,954 A | 6/1990 | Thompson et al. |
| 5,172,404 A | 12/1992 | Hashimoto |
| 5,283,818 A | 2/1994 | Klausner et al. |
| 5,644,629 A | 7/1997 | Chow |
| 5,675,507 A | 10/1997 | Bobo, II |
| 5,822,405 A | 10/1998 | Astarabadi |
| 5,826,026 A | 10/1998 | Friedman |
| 5,894,505 A | 4/1999 | Koyama |
| 5,915,026 A | 6/1999 | Mankovitz |

(Continued)

OTHER PUBLICATIONS

International Search Report and Written Opinion of the International Searching Authority for International Application No. PCT/US05/23790, mailed Sep. 21, 2006.

(Continued)

*Primary Examiner* — Simon Sing
(74) *Attorney, Agent, or Firm* — Toler Law Group, PC

(57) ABSTRACT

A method includes receiving a call signal associated with an incoming communication at a first device. The method includes sending a request to a second device to store a voice message at a network storage device. The second device is configured to store the voice message associated with the incoming communication based on the incoming communication being unanswered by the first device.

20 Claims, 4 Drawing Sheets

(56) References Cited

U.S. PATENT DOCUMENTS

| | | | |
|---|---|---|---|
| 5,974,131 A * | 10/1999 | Malik | H04M 1/6505 379/215.01 |
| 6,282,269 B1 | 8/2001 | Bowater et al. | |
| 6,310,939 B1 * | 10/2001 | Varney | H04M 3/436 379/212.01 |
| 6,337,858 B1 | 1/2002 | Petty et al. | |
| 6,404,764 B1 | 6/2002 | Jones et al. | |
| 6,434,143 B1 * | 8/2002 | Donovan | H04L 51/36 370/351 |
| 6,615,236 B2 | 9/2003 | Donovan et al. | |
| 6,621,800 B1 | 9/2003 | Klein | |
| 6,792,094 B1 * | 9/2004 | Kirkpatrick | H04M 3/42229 379/209.01 |
| 6,987,765 B2 | 1/2006 | March et al. | |
| 7,050,447 B2 | 5/2006 | Silverman et al. | |
| 7,245,707 B1 * | 7/2007 | Chan | H04M 1/7255 370/229 |
| 7,480,260 B1 | 1/2009 | Vashisht et al. | |
| 7,489,867 B1 * | 2/2009 | Viscardi | H04L 29/06027 398/58 |
| 2001/0000826 A1 | 5/2001 | Bellamy | |
| 2002/0162116 A1 | 10/2002 | Read et al. | |
| 2003/0125021 A1 | 7/2003 | Tell et al. | |
| 2003/0142795 A1 | 7/2003 | Gavette et al. | |

OTHER PUBLICATIONS

Black, U., "Voice Over IP", Prentice-Hall, Inc., Upper Saddle River, NJ, 2000, pp. 165-166.

* cited by examiner

SYSTEM AND METHOD FOR MANAGING MESSAGES IN A PACKETIZED VOICE ENVIRONMENT

PRIORITY CLAIM

This application is a continuation of and claims priority from U.S. patent application Ser. No. 13/896,473 filed on May 17, 2013 and entitled "SYSTEM AND METHOD FOR MANAGING MESSAGES IN A PACKETIZED VOICE ENVIRONMENT", which is a continuation of and claims priority from U.S. patent application Ser. No. 12/637,504 filed on Dec. 14, 2009, now issued as U.S. Pat. No. 8,467,508, and entitled "SYSTEM AND METHOD FOR MANAGING MESSAGES IN A PACKETIZED VOICE ENVIRONMENT", which is a divisional of and claims priority from U.S. patent application Ser. No. 10/887,210, filed on Jul. 8, 2004, now issued as U.S. Pat. No. 7,684,549, and entitled "SYSTEM AND METHOD FOR MANAGING MESSAGES IN A PACKETIZED VOICE ENVIRONMENT," each of which is incorporated herein by reference in its entirety.

FIELD OF THE DISCLOSURE

The present disclosure relates generally to packetized telephony, and more specifically to a system and method for managing messages in a packetized voice environment.

BACKGROUND

Packetized voice offerings like Voice over Internet Protocol (VoIP) have become increasingly popular in recent years. In general, VoIP offerings provide for the transport of voice streams over a data network using data transport protocols more commonly associated with the Public Internet, namely User Datagram Protocol/Internet Protocol (UPD/IP) suite.

As packetized voice offerings have begun to blur the line between voice traffic and data traffic, services like voicemail and messaging have migrated into the network. Several telephony providers now manage these offerings at a centralized messaging system located in the network. When a caller fails to reach a called party, the caller may simply be routed to a unified messaging center and prompted to leave a message.

While such a solution may provide improved efficiencies for the network operator and/or service provider, many users may find the available solutions wanting.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

Figure 1:
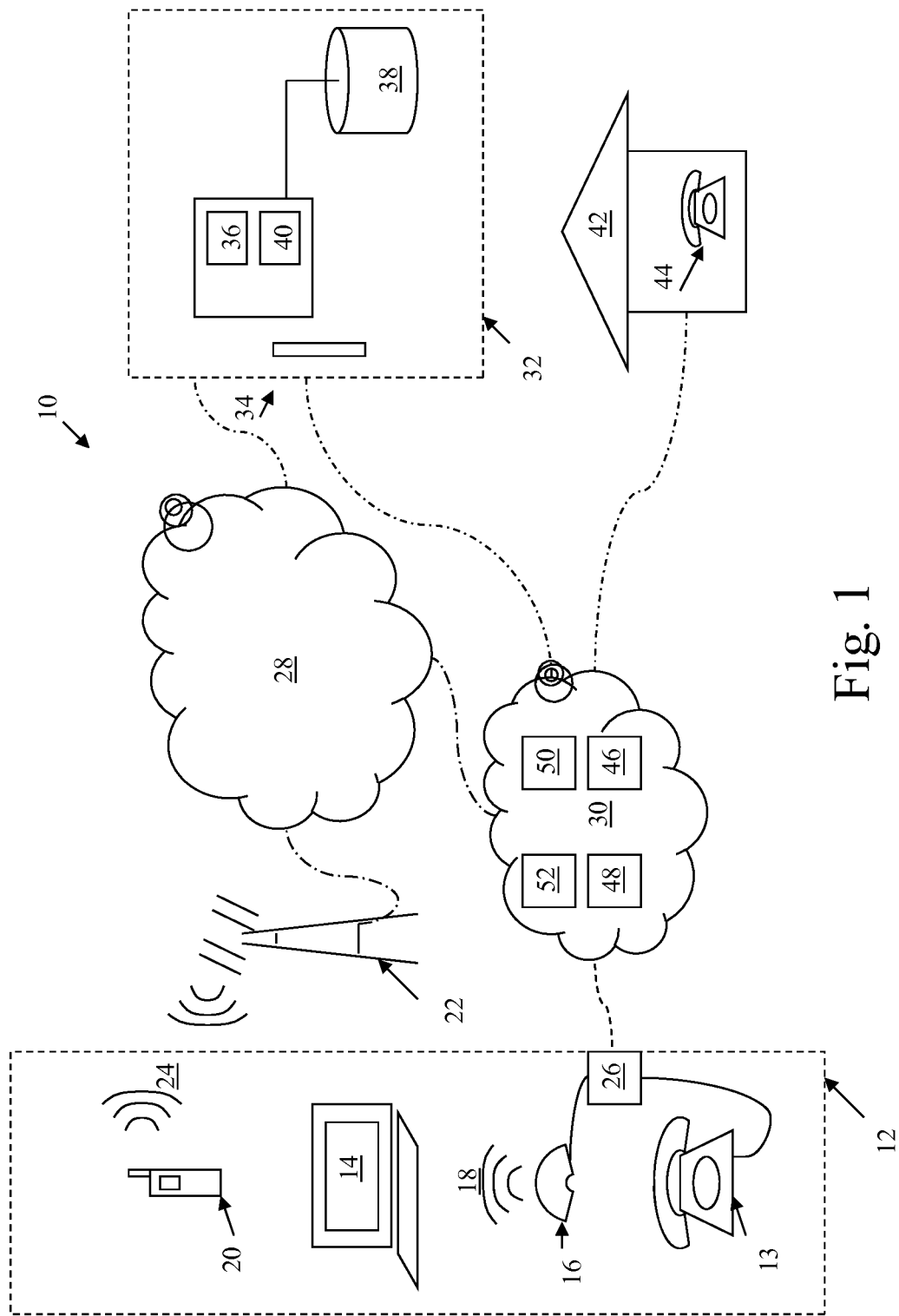
FIG. 1 presents a block diagram of a message management system that incorporates teachings of the present disclosure.

As VoIP deployments expand into the residential telephony market, voicemail and messaging services may begin to move in-network. As such, a call to a VoIP subscriber that goes unanswered may get routed to a centralized unified messaging center. While such a solution may represent an improvement in network efficiency, some subscribers may want to have more control over the incoming call.

The present disclosure describes techniques for facilitating a higher degree of call control in a packetized voice system. While the disclosure describes VoIP offerings implemented in a communication network that utilizes the Session Initiation Protocol (SIP), the teachings may also be applied to other networks and with other protocols and call control schemas. From a high level, a system and/or method incorporating teachings of the present disclosure may provide a packetized voice subscriber with the ability to screen incoming calls, to store important messages locally, to better manage privacy issues surrounding stored messages, and combinations thereof.

In practice, these capabilities may be supported by one or more SIP applications. SIP offers a text-based description protocol that allows two systems to describe a communicated media stream. The description itself may include information relating to authentication, caller identification (ID), media stream parameters, and/or other information for supporting the call between two endpoints.

In operation, a call intended for a dialed number may be received in network on a channel or other communication link. A call receipt process may begin in order to learn what to do with and where to "send" the received call. For example, a dialed number, or some other type of device address may be translated into a variable for use during call processing activities. The processing activities may include, for example, a number of match tests performed against the variable. These match tests may be executed until a match is found.

A found match may have several allocated operators. These operators often have a priority indicator telling a processing server in what order the server should attempt to execute the applications associated with the found match. When, for example, there are three operations associated with a given match, a SIP-based system may prioritize the operations by giving them respective priority values of 1, 2, and 3—telling the processing server to try the priority 1 operation first. In some embodiments, the operators and/or their respective priority indicators may be altered by a subscriber in near real time. A subscriber may want "dial home" to be the number one priority during one window of time and "dial voicemail" to be the number one priority during some other window of time.

In one embodiment, when an inbound call is directed to a particular dialed number (e.g., 512-345-6789), a variable value of a portion of the particular dialed number (e.g., 6789) may be assigned to the dialed number. The variable may then be compared against a list of match statements to determine how to handle the call. When the priority 1 application for the match is "Dial home," this application may be performed.

The Dial application may direct the processing server to ring a remote channel and then connect the two channels together when a connect call signal is received from the called device. As mentioned above, when a Dial application gets an answer on the remote channel, the two callers may be bridged together and the call may proceed. After the call, one or both parties to the call may "hang up". When this occurs, the Dial routine may exit and the priority list may stop executing.

In some cases, there may be no answer to the call launched by the Dial application. When, for example, the Dial application rings a remote phone for some set amount of time, which may be specified in a Dial statement, and there is no answer, Dial may exit and the next priority application may be executed. In a system incorporating teachings of the present disclosure, the next application may include both a Continued Dial application and a Copy to Network Voicemail application. For example, a called party may have a piece of VoIP Customer Premises Equipment (CPE) that acts as a premises answering machine. The caller may be connected to the CPE and hear an "unavailable" greeting for the called party. The greeting may prompt the caller to leave a message, which may be stored locally on the CPE and copied in-network at a centralized messaging center. Depending upon implementation detail, the copying may occur simultaneously or at some later time. Moreover, the copying may occur automatically and/or at the direction of the called party subscriber.

As indicated above, when a SIP application, like the Dial application, proves ineffective, a SIP processing server may need to move to a next or higher level priority application. In practice, an ineffective Dial application may be exited and an adder value may be applied to the existing priority value—allowing the processing server to move ahead to a new priority level.

A service provider may elect to provide SIP-like functionality using several different architectures. Depending upon implementation detail, some SIP components may be combination modules or discrete modules, implemented in software, hardware, and/or firmware. From a high level, many SIP system components may be acting as or executing user agents (UA) and/or SIP servers.

For example, telephony devices may include user agents (UAs), which may be a combination of a user agent client (UAC) and a user agent server (UAS). In operation, a UAC entity may be permitted to create an original request, and a UAS may represent one or more server types capable of receiving requests and sending back responses. A SIP UA may be implemented in hardware such as an Internet Protocol (IP) phone or a gateway component or in software such as a softphone application running on a computing platform.

Various SIP UAs may connect to one another with the help of a collection of SIP servers. In many cases, these SIP servers may be executing on centralized hosts of a distributed communication network. Again depending upon implementation detail, a large SIP system may include several different kinds of servers such as Location Servers, Proxy Servers, Redirect Servers, and Registrar Servers.

In operation, a Location Server may be used by a Redirect server or a Proxy Server to obtain information about a called party's location. A Proxy Server may represent an intermediary program that acts as both a server and a client for the purpose of making requests on behalf of other clients. Such requests may be serviced internally or transferred to other servers. In some cases, a Proxy Server may interpret and then rewrite a request message before forwarding it. A Redirect Server may accept a SIP request, map the address into zero or more new addresses, and return these addresses to the client. In some cases, the Redirect Server may be designed such that it does not accept calls but does generate SIP responses that instruct a UAC to contact another SIP entity. As the name implies, a Registrar Server may accept REGISTER requests and may be co-located with a Proxy or Redirect server to offer these servers some level of location server-like assistance.

In a particular embodiment, a voice management method includes invoking an updatable call completion rule in a memory of an answering machine module in customer premises equipment. The answering machine module receives an incoming call signal for a session initiation protocol user agent. The session initiation protocol user agent has a first address and the answering machine module has a second address different from the first address. The method further includes saving a message received from a calling party associated with the incoming call signal to the memory via the answering machine module. The method also includes sending a graphical user interface from the answering machine module to a display of the customer premises equipment to present information about the incoming call.

In a particular embodiment, a messaging system includes a processor and at least one memory accessible to the processor. The messaging system further includes an interface to facilitate communicatively coupling the processor to a premises network. The messaging system further includes a session initiation protocol user agent application in the at least one memory. The session initiation protocol user agent application is operable to be executed by the processor to receive an incoming voice over internet protocol call directed to a first address. The messaging system further includes an answering machine module in the at least one memory. The answering machine module includes processor-readable instructions executable by the processor to play a recorded announcement to a calling party of the incoming voice over internet protocol call. The answering machine module also includes processor-readable instructions executable by the processor to record a message communicated from the calling party in response to the recorded announcement in the at least one memory upon fulfillment of at least one updatable call completion rule. The messaging system also includes a display. The answering machine module includes additional processor-readable instructions executable by the processor to present a graphical user interface to display information about one or more messages recorded in the at least one memory by the answering machine module at the display.

In a particular embodiment, a voicemail messaging method includes receiving a signal indicating a request to complete a voice over internet protocol call from a calling party to a voice over internet protocol device of a called party. The voicemail messaging method further includes communicating an incoming call signal to a device address associated with the voice over internet protocol device of the called party. The voicemail messaging method further includes receiving a connect call request from an answering machine module coupled to the voice over internet protocol device upon fulfillment of at least one updatable call completion rule. The voicemail messaging method further includes connecting the calling party and the answering machine module. The voicemail messaging method further includes maintaining information about the called party in a network repository. The information includes a mailbox address for a network-based voicemail box. The voicemail messaging method further includes saving a voicemail message in the network-based voicemail box. The voicemail messaging method further includes receiving a transfer request from the answering machine module requesting that a copy of the saved voicemail message be communicated to the answering machine module. The voicemail messaging method also includes bridging a first communication channel of the answering machine module with a network-based voicemail box channel to facilitate communication of the copy of the saved voicemail message to the answering machine module.

As referenced above, a SIP system may facilitate providing enhanced call control features that incorporate teachings of the present disclosure. Many features, in addition to the above-described features may be better understood in connection with the Figures. As mentioned above, FIG. 1 presents a block diagram of a message management system 10 that incorporates teachings of the present disclosure. As depicted, a system 10 includes a remote physical location 12 that contains various computing devices accessible by a user or subscriber. The devices may include, for example, a wired telephone 13 (which may be a Plain Old Telephony Service (POTS) telephone and/or a VoIP telephone), a laptop computer 14, and a wireless telephone 20, each of which may be capable of executing a SIP UA. Moreover, each of these devices may possess an effective identifier, which could include an IP address, a telephone number, a Media Access Control address, a Data Link Control (DLC) address, and/or some other addressable identifier.

In the embodiment of FIG. 1, the laptop computer 14 may a have short-range or local area wireless transceiver that serves to connect the laptop computer 14 to a local area network (LAN) hub 16 across a wireless link 18. As depicted, the LAN hub 16 may communicate with one or more local devices across a wireless link. In some embodiments, the LAN hub 16 may communicate across wired links. Moreover, the LAN hub 16 may act as an EtherSwitch or router and may utilize a backhaul at least partially provided by a service line data connection to a broadband network interface device like a modem 26. Depending upon implementation detail, the modem 26 may be configured to communicate digital VoIP data via an IP Protocol network (e.g., the Public Internet). The modem 26 may be an asynchronous digital subscriber line (ADSL) modem, a digital subscriber line (DSL) modem, a satellite modem, a fiber optic termination point, a cable modem, or other high-speed interface.

Within the system 10, the wireless phone 20 may also be "connected" to a cellular network node 22 across a wireless link 24, which may be, for example, a General Packet Radio Service (GPRS) or some form of Enhanced Data GSM Environment (EDGE). The wireless links 18 and 24 may be implemented in several ways. The wireless link type may depend on the electronic components associated with given wireless devices and wireless LAN hubs. The wireless computing device, wireless hub, or both, referred to as "the Wireless Enabled Device," may include any of several different components. For example, the Wireless Enabled Device may have a wireless wide area transceiver, which may be part of a multi-device platform for communicating data using radio frequency (RF) technology across a large geographic area. This platform may for example, be a GPRS, EDGE, or a third generation groupe special mobile (3GSM) platform, and may include multiple integrated circuit (IC) devices or a single IC device.

The Wireless Enabled Device may also have a wireless local area transceiver that communicates using spread-spectrum radio waves in a 2.4 GHz range, 5 GHz range, or other suitable range. The wireless local area transceiver may be part of a multi-device or single device platform and may facilitate communication of data using low-power RF technology across a small geographic area. For example, when the wireless local area transceiver includes a Bluetooth transceiver, the transceiver may have a communication range with an approximate radius of twenty-five to one hundred feet. When the wireless local area transceiver includes an 802.11(x) transceiver, such as an 802.11(a)(b) or (g), the transceiver may have a communication range with an approximate radius of one hundred fifty to one thousand feet.

As shown in FIG. 1, the LAN hub 16 may represent an 802.11(x) embodiment, which may be referred to as a hotspot or access point. The LAN hub 16 may be communicatively coupled to the modem 26, which may be capable of connecting the LAN hub 16 to a broader network (e.g., the Public Internet 28). As shown, both the laptop computer 14 and the wireless phone 20 may be ultimately coupled to the Public Internet 28. The laptop computer 14 may connect via the wireless link 18 to the LAN hub 16 and via the modem 26 to a service provider network 30, which may facilitate connection to the Public Internet 28. In some embodiments, the service provider network 30 may be a cable network, and the modem 26 may be a cable modem. In some embodiments, service provider network 30 may be a Public Switched Telephone Network (PSTN), and the modem 26 may be an xDSL modem. While the modem 26 and the LAN hub 16 are depicted as stand-alone and discrete devices, they may also be combined into a single device.

In practice, the information communicated across the various links of the system 10 may be compressed and/or encrypted prior to communication. Communication may be at least partially via a circuit-switched network like the PSTN, a frame-based network like Fibre Channel, or a packet-switched network that may communicate using Transmission Control Protocol/Internet Protocol ("TCP/IP") and/or User Datagram Protocol/Internet Protocol ("UDP/IP") packets like the Public Internet 28. The physical medium making up at least some portion of the various links may be coaxial cable, fiber, twisted pair, an air interface, other interface, or a combination thereof. In some embodiments, network access links may provide a broadband connection facilitated by an xDSL modem, a cable modem, an 802.11x device, some other broadband wireless linking device, or a combination thereof. The broadband connection may include a link providing data rates greater than 56 Kbps. Other broadband connections may provide data rates greater than 144 Kbps, 256 Kbps, 500 Kbps, 1.0 Mbps, 1.4 Mbps, or faster.

In a particular embodiment of the system 10, a user may maintain a network connection from the premises 12 to the service provider network 30 and may subscribe to a VoIP service. In some embodiments, the user may make use of a network-based messaging system 32 for storing messages like voicemail messages, electronic mail messages, mobile alert messages, Short Messaging Service messages (SMS), Enhanced Messaging Service messages (EMS), and/or Multi-media Messaging Service messages (MMS). As depicted, the network-based messaging system 32 may be communicatively coupled to the service provider network 30. In operation, the network-based messaging system 32 may include a gateway 34 that receives queries, calls, and/or messages from other system devices. The gateway 34 may communicate with a memory engine 36 that manages and maintains information stored in a memory 38. The stored information may include, for example, unified mailboxes for messaging subscribers. In some embodiments, the memory engine 36 may also include an update engine 40 that allows subscribers to modify, read from, copy from, and/or write to, the mailboxes.

During operation of the system 10, a calling party at a premises 42 may use a VoIP telephone 44 to place a call to a called party staying at the location 12, which may be a home, an office, a hotel, and/or some other location. The VoIP call may be held at a SIP server 46 located within the service provider network 30. A SIP server 46 may utilize a location server 48 to determine an appropriate device address for the called party. The device address may be, for example, a telephone number, an IP address, a MAC address, and/or some other effective identifier.

In the embodiment depicted in FIG. 1, the device address may identify a device at the location 12. For example, the device address may be associated with a softphone executing on the laptop computer 14. As such, the SIP server 46 may call the softphone and wait for a complete call request. In some cases, the called party may be "on" the softphone and/or unavailable to receive the call from the calling party. In some embodiments, the SIP server 46 may move to a second level priority application and route the calling party to the network-based messaging system 32. In some cases, the SIP Server 46 may have a second level priority that involves the direct calling of a SIP UA associated with a premises based answering machine module executing on a device at the location 12.

In such an embodiment, the answering machine module may indicate its willingness to accept the call by issuing a SIP complete call request. Moreover, the calling party may be bridged to the answering machine module. The calling party may be played an announcement and may leave a message that is stored locally at the location 12.

In preferred embodiments, the service provider network 30 may also include a modification server 50 and a messaging server 52. The modification server 50 may be designed to allow a subscriber to call in and update the manner in which incoming calls to the subscriber are to be handled. For example, the subscriber may change the order of to-be-tried call completions and/or the device addresses to be tried. The messaging server 52 may maintain a list indicating whether a given subscriber utilizes a voicemail box and whether the utilized voicemail box is network-based and/or premises-based.

Figure 2:
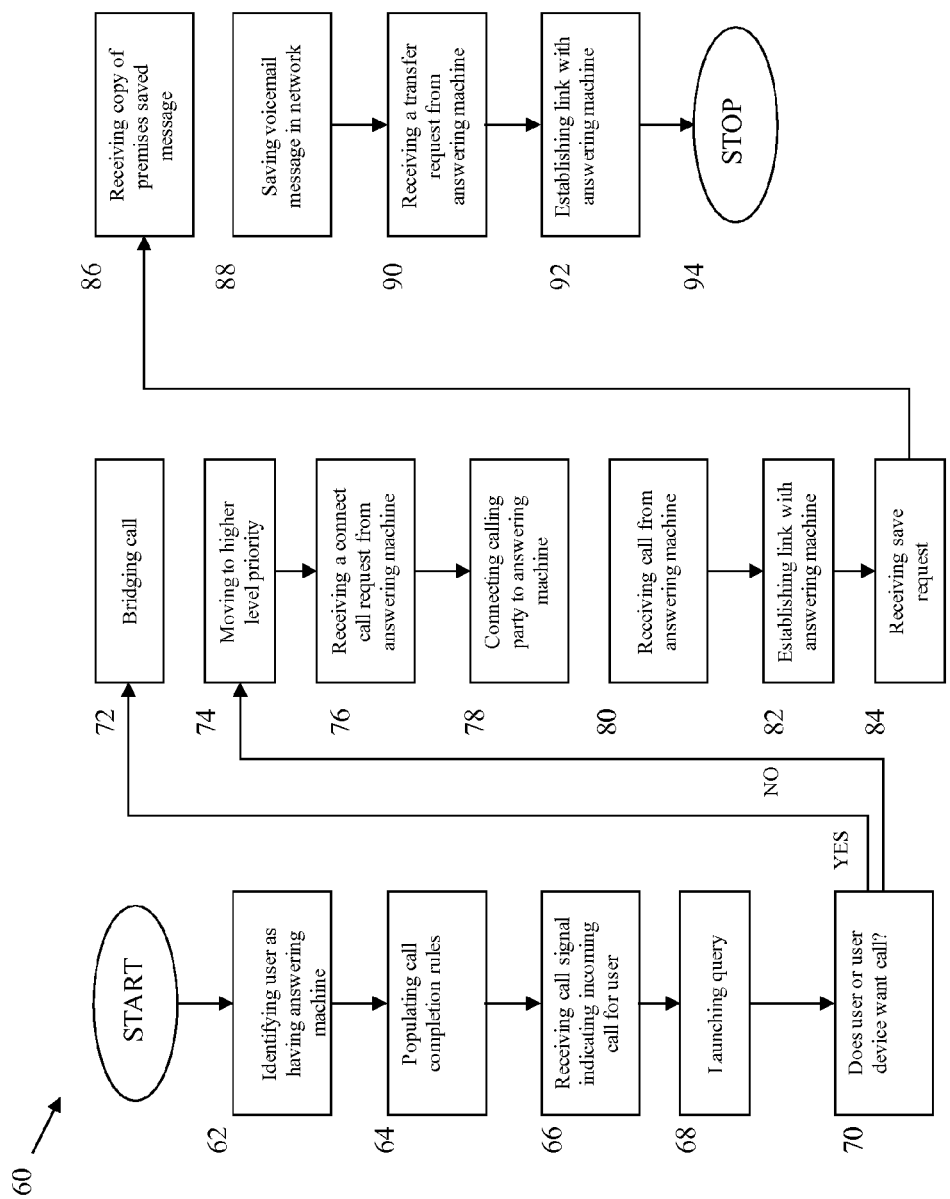
FIG. 2 shows a flow diagram for a call control technique that may be used to implement teachings of the present disclosure.

The operation of a system like the system 10 may be better understood by reference to additional figures. As mentioned above, FIG. 2 shows a flow diagram for a technique 60 that may be used to implement teachings of the present disclosure. At 62, a VoIP subscriber may be identified as someone who has access to a premises-based voicemail system. A memory may be populated with a subscriber identifier, which may be a ten-digit telephone number and/or an Internet Protocol or MAC address associated with the premises-based voicemail system. The memory may also be populated with updateable call completion rules for managing incoming calls to the subscriber and voicemail system addressing information.

In some embodiments, the addressing information may include a telephone number, an Internet Protocol address, a data network connection rule, and/or some other address. The addressing information may also be updateable and represent a then-current mechanism for contacting a subscriber voicemail system. At 64, subscriber call completion rules may be populated. This population may represent an initial population or a subsequent modification of earlier rules. In practice, a subscriber may not want to save voice messages at the subscriber's premises every time there is an unanswered incoming call.

At 66, a signal may be received indicating a desire to complete a call or send a message to the subscriber. In response to the message, a query may be sent to a SIP user agent executing on a computing platform associated with the called party subscriber. The query may be launched, at 68, and may result in the ringing of a piece of CPE at the subscriber's premises. When the call is answered, at 70, a signal indicating a desire to complete the VoIP call from the calling party to called party may be received and the call may be bridged, at 72.

When the call is unanswered, at 70, a network-based SIP server may move to a level two priority and send, at 74, a SIP query to a different user agent executing on a computing platform associated with a called party answering machine module. At 76, a connect call request from the answering machine module may be received, and the calling party may be connected to the answering machine module, at 78.

As mentioned above in relation to 62, a system executing the technique 60 may maintain information about the called party in a network repository. In some embodiments, the information may include a mailbox address for a network-based voicemail box. At 80, a call from the answering machine module may be received, and, at 82, a communication link with the answering machine module may be established. At 84, a save request may be received from the answering machine module requesting that a copy of a voice message left by an earlier calling party at the answering machine module be saved in the network-based voicemail box. At 86, a copy of the voice message may be communicated to the network-based voicemail box.

Similarly, at 88 a different voicemail message may be saved originally in the network-based voicemail box. At 90, a transfer request from the subscriber may be received requesting that a copy of the different voicemail message be communicated to the answering machine module. In response to the request and at 92, a link may be established between an answering machine module communication channel and a network-based voicemail box channel to facilitate communication of the different voicemail message to the answering machine module. The technique 60 may then progress to a stop, at 94. Though the technique 60 has been described as having a particular sequence, additional steps may be added, steps may be removed, steps may be re-ordered, and/or looped, without departing from the teachings of the present disclosure.

As mentioned above, FIG. 3 presents a simplified block diagram for a system 96 that incorporates teachings of the present disclosure to present an enhanced level of VoIP call control. The system 96 includes a laptop computer 98, which may rely on a connection 100 to provide at least a portion of a link to a data network like the Public Internet. The connection 100 may, for example, connect the laptop computer 98 to a broadband network access device and/or a premises network, which may in turn be communicatively coupled to a wide area network like the PSTN or a cable network.

A web browser application may be running on laptop computer 98 and may present a user of the laptop computer 98 with a navigation window 102 and a display pane 104. In operation, a user may type a Uniform Resource Locator (URL) into a portion of the navigation window 102 and a page having that URL may be communicated to laptop computer 98 and presented within the display pane 104. When the laptop computer 98 sends a request for the page having the input URL, a network element of the data network may recognize in the request an address to which it should send the page.

The presence of a network connection at least partially provided via the connection 100 may be recognized by a component of the laptop computer 98. For example, the laptop computer 98 may include a computer-readable medium 106 storing computer-readable data. Execution of some part of this data by a processor 108 may allow the laptop computer 98 to act as VoIP softphone and a premises-based answering machine module, which may operate in association with the VoIP telephone. For example, a software version of a VoIP answering machine may be able to initiate an answering of an incoming VoIP call, a playing of a recorded announcement to a calling party, and a saving of a message from the calling party. In some embodiments, the answering machine functionality may occur while a user is operating the softphone—allowing the user to simultaneously engage in a VoIP call and receive a voicemail.

Figure 3:
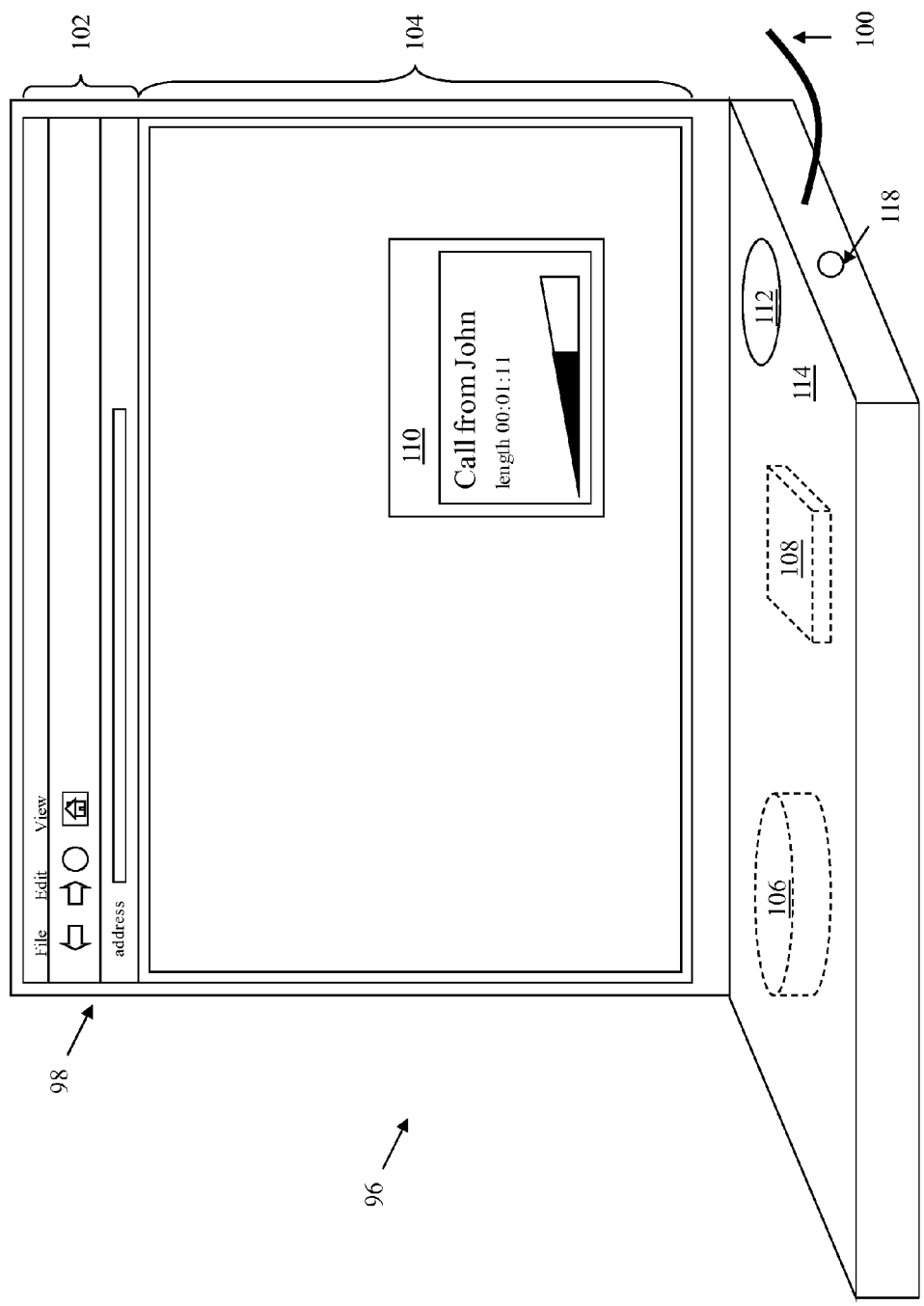
FIG. 3 presents a simplified block diagram for a system that incorporates teachings of the present disclosure to provide an enhanced level of VoIP call control to the called party.

The laptop computer 98 may also be capable of initiating presentation of a graphical user interface (GUI) element 110 that may, as depicted, present call information to the user. As shown, the GUI element 110 may indicate to the user that a call from "John" has been received by the answering machine module and that "John" is currently leaving a message with a length of one minute and eleven seconds. In some embodiments, the user may be listening to the message while it is being saved or later with a speaker assembly 112, which may be designed to interact with a housing component 114 of the laptop computer 98. In some embodiments and as shown in FIG. 3, the GUI element 110 may provide a sloped and shaded triangle or some other indication of the current volume setting. As depicted, the housing component 114 may also at least partially form an interior cavity that houses the processor 108 and a memory medium 106, which may be RAM, ROM, flash, and/or some other appropriate form of memory.

Though the system 96 shows an integrated system where a single computer embodies a computer, a VoIP telephone, and a software implemented answering machine module, other form factors and designs may be employed to practice teachings of the present disclosure. A system designer may elect to utilize a stand-alone VoIP telephone connected to a stand-alone answering machine module that has its own housing. The connection may be fixed or removable. For example, an answering machine module may have a Universal Serial Bus (USB) interface capable of being plugged into a mating USB interface of a VoIP telephone. Other interface designs may include, for example, an 802.11(x) interface, a Bluetooth interface, a Type I, II, and/or III Personal Computer Memory Card International Association (PCMCIA) card and slot interface, some other memory card form factor interface, a Firewire interface, and/or an appropriate parallel bus interface.

With such a design, the answering machine module may be relatively portable. It may be plugged into a VoIP telephone having one telephone number and later plugged into a different VoIP telephony device having a different telephone number. In the depicted system of FIG. 3, for example, a discrete answering machine module may be plugged into the laptop computer 98 via an interface 118, which may be a USB interface. With reference to FIG. 1, a designer may also elect to provide a removable module and/or build an answering machine module into one or more of the devices located at the location 12.

Figure 4:
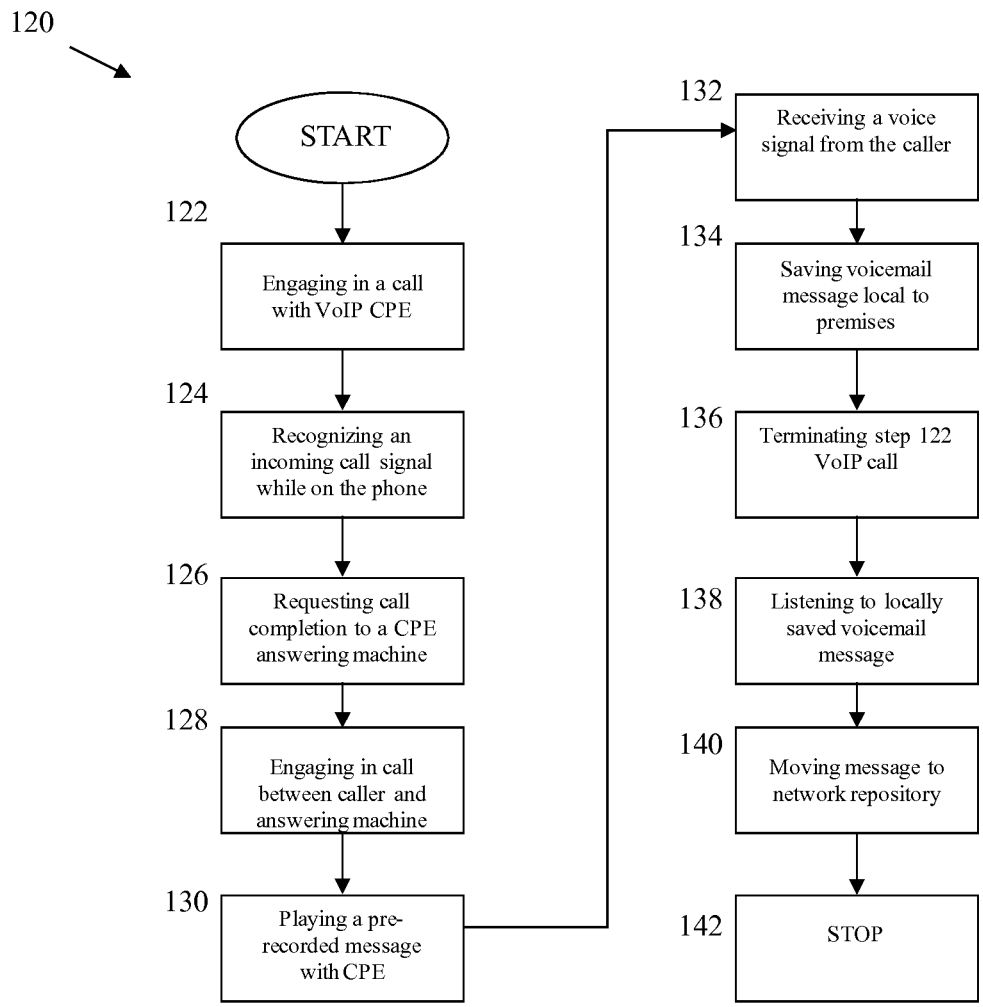
FIG. 4 shows a flow diagram for a technique that may be used to implement teachings of the present disclosure.

Consideration of FIG. 4 may assist in providing a better understanding of how a user may make use of a system like the system 96 of FIG. 3. FIG. 4 shows a flow diagram for a technique 120 that may be used to implement teachings of the present disclosure. At 122, a user may be engaging in a VoIP or other telephone call. While engaged in the call, a system like the system 96 of FIG. 3 may, at 124, recognize an incoming call signal. For example, a computing platform at the user's premises may be executing a SIP UA, and the SIP UA may recognize a query from a service provider network node indicating that a calling party seeks connection.

At 126, a piece of CPE may request that the incoming call be completed to a specific device. For example, a VoIP telephone station engaged in another call may respond to the query and ask that the call be completed to a premises located answering machine module. Depending upon design criteria, the actual process of completing the call to the answering machine may involve additional query and response cycles between pieces of CPE and the service provider network node. However accomplished, the caller and the answering machine module may engage in a communication, at 128. At 130, the answering machine module may play a pre-recorded announcement to the caller, and at 132, the answering machine module may receive a voice signal indicating an utterance of the caller.

At 134, a copy of the caller's voicemail message may be saved in a memory resident at the customer premises. In an embodiment in which the voicemail message was left while the user was engaged in another call, the user may terminate the other call at 136 and listen to the recorded voicemail message, at 138. In some embodiments, the user may elect to move and/or copy the locally saved voicemail message to a network-based repository, at 140. The technique 120 may then progress to a stop, at 142. As with technique 60, technique 120 has been described as having a particular sequence. Additional steps may be added, steps may be removed, steps may be re-ordered, and/or looped, all without departing from the teachings of the present disclosure.

It should also be understood that the incoming call signal referenced above may arrive via a data link connecting a piece of CPE to a broader network. The broader network may be a SIP-enabled network capable of communicating packetized data such as Internet Protocol (IP) data packets, and the data link may include, for example, a Global Packet Radio Services (GPRS) link, an Enhanced Data GSM Environment (EDGE) link, a cable modem link, a satellite link, and a Digital Subscriber Line (DSL) link.

As mentioned above, a user may want an incoming call to go to a local answering machine and/or a unified messaging service. In some embodiments, the subscriber may also want to receive a text-based and/or audio-based version of the message at a different device. In operation of systems like the system 10 depicted in FIG. 1 and the system 96 depicted in FIG. 3, nodes, servers, modules, agents, platforms, mechanisms, and/or engines may be implemented in several ways. For example, they may include hardware, firmware, software, executable code, and/or a combination thereof. Platforms, which may be implementing nodes, servers, modules, mechanisms, and/or engines, may be made up of a microprocessor, a personal computer, a computer, some other computing device, or a collection thereof. Though nodes, servers, modules, agents, platforms, mechanisms, and/or engines may have been described as individual elements, one or more may be combined and designed to operate as a single element.

In various embodiments, the communication devices described herein may take forms including computers, laptops, desktops, wireless and cordless phones, pagers, personal digital assistants with built in communications circuitries, cellular telephones, mobile telephones, and other electronic devices having processing and network access capabilities.

The methods and systems described herein provide for an adaptable implementation. Although certain embodiments have been described using specific examples, it will be apparent to those skilled in the art that the disclosure is not limited to these few examples. Additionally, various types of wireless transceivers, transmitters, receivers, and protocols are currently available which could be suitable for use in employing the methods as taught herein. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present disclosure. Accordingly, the present disclosure is not intended to be limited to the specific form set forth herein, but on the contrary, it is intended to cover such alternatives, modifications, and equivalents, as can be reasonably included within the scope of the disclosure as provided by the claims below.

What is claimed is:

1. A method comprising:
   receiving a call signal associated with an incoming communication at a first device, wherein the call signal is received when the first device is engaged in a call, and wherein the call is distinct from the incoming communication; and
   sending a request to a second device to store a voice message associated with the incoming communication at a network storage device, wherein the second device is configured to:
      store the voice message based on the incoming communication being unanswered by the first device;
      receive an indication in response to the call signal being received at the first device, wherein the first device is a first customer premises equipment device, and wherein the second device is a second customer premises equipment device; and
      send a copy of the voice message to the network storage device responsive to the request.

2. The method of claim 1, wherein a text-based version of the voice message is provided to a third device that is distinct from the first device and the second device.

3. The method of claim 1, wherein the call signal is received at the first device via a session initiation protocol server, and wherein the session initiation protocol server is configured to send the indication to the second device based on a completion rule associated with a priority of devices to be notified based on the incoming communication.

4. The method of claim 3, wherein the session initiation protocol server is configured to generate the indication based on the first device being engaged in the call when the call signal is received by the first device or based on an amount of time that the call signal is received by the first device.

5. The method of claim 1, wherein the second device is configured to receive the indication via a session initiation protocol server based on a completion rule, and wherein the indication includes a session initiation protocol query.

6. The method of claim 1, wherein the request is sent after the voice message is stored at the second device.

7. The method of claim 1, wherein the first device is associated with a first internet protocol address, and wherein the second device is associated with a second internet protocol address.

8. The method of claim 1, wherein the network storage device is associated with a service provider network, wherein the first device and the second device are included in a combined communication device, and wherein the combined communication device is a wireline telephone, a cellular telephone, a computer, an access point, or a modem.

9. A system comprising:
   a processor; and
   a memory accessible to the processor, the memory including instructions that, when executed by the processor, cause the processor to perform operations comprising:
      receiving, at a first device, a call signal associated with an incoming communication; and
      sending a request to a second device to store a voice message associated with the incoming communication at a network storage device, wherein the request is sent after the voice message is stored at the second device, and wherein the second device is configured to:
         store the voice message based on the incoming communication being unanswered by the first device; and
         send a copy of the voice message to the network storage device responsive to the request.

10. The system of claim 9, wherein the memory and the processor are included in the first device.

11. The system of claim 9, wherein a text-based version of the voice message is provided to a third device that is distinct from the first device and the second device.

12. The system of claim 9, further comprising a display device, wherein the operations further comprise sending a graphical user interface to the display device to present information related to the incoming communication.

13. The system of claim 12, wherein the graphical user interface includes an indication of a duration of the voice message as the voice message is being stored at the second device.

14. The system of claim 12, wherein the graphical user interface includes a name of a caller associated with the incoming communication, an indication of a volume setting associated with the first device, or both.

15. The system of claim 9, wherein the call signal is provided to the first device via a server, and wherein the server includes a priority list that indicates an order in which the server is to attempt to route the incoming communication to the first device, the second device, the network storage device, or a combination thereof.

16. The system of claim 9, wherein the first device includes a speaker configured to output audio corresponding to the voice message as the voice message is being stored at the second device.

17. A computer readable storage device storing instructions that, when executed by a processor, cause the processor to perform operations comprising:
   receiving a call signal associated with an incoming communication at a first device; and sending a request to a second device to store a voice message associated with the incoming communication at a network storage device, wherein the second device is configured to store the voice message based on the incoming communication being unanswered by the first device, and to send a copy of the voice message to the network storage device responsive to the request, wherein the network storage device is associated with a service provider network, wherein the first device and the second device are included in a combined communication device, and wherein the combined communication device is a wireline telephone, a cellular telephone, a computer, an access point, or a modem.

18. The computer readable storage device of claim 17, wherein the operations further comprise receiving a second call signal associated with a second incoming communication at the first device, wherein, based on the incoming communication being unanswered by the first device, the network storage device is configured to store a second voice message associated with the second incoming communication.

19. The computer readable storage device of claim 18, wherein the network storage device is configured to automatically provide a copy of the second voice message to the second device concurrently with the second voice message being stored at the network storage device.

20. The computer readable storage device of claim 18, wherein the second device is configured to store the voice message based on a first completion rule, and wherein the network storage device is configured to store the second voice message based on a second completion rule.

* * * * *